Patented Sept. 10, 1935

2,013,725

UNITED STATES PATENT OFFICE 2,013,725

ALCOHOL ADDITION PRODUCTS OF UNSATURATED COMPOUNDS AND PROCESS FOR PRODUCING SAME

Wallace H. Carothers, Fairville, Pa., and Ralph A. Jacobson, Ardentown, Del., assignors to E. I. du Pont de Nemours & Company, Wilmington, Del., a corporation of Delaware No Drawing. Application April 14, 1933, Serial No. 666,170

20 Claims. (Cl. 260—151)

This invention relates to a new reaction involving unsaturated hydrocarbons and it pertains more particularly to the condensation of alcohols with hydrocarbons containing conjugate unsaturated bonds, at least one of which is acetylenic in character.

One object of this invention comprises the reaction of an alcohol or a thioalcohol with a hydrocarbon containing conjugate unsaturation. Another object of the invention relates to the preparation of valuable products by the interaction of monovinylacetylene, divinylacetylene, and analogous compounds with alcohol. A more specific object comprises the preparation of compounds having the general formula $$CH_3C{\equiv}CCH_2OR,$$

in which R is a hydrocarbon radical. Other objects of the invention will appear in the following description.

The invention is carried out in general by heating a suitable unsaturated hydrocarbon with an alcohol in the presence of a strongly alkaline condensing agent and at a temperature which is preferably about 100° C.

A suitable method for carrying out the present invention as applied, for example, to the condensation of alcohols with monovinylacetylene, comprises heating approximately chemical equivalent amounts of the two reactants in the presence of a small amount (0.05–0.20 chemical equivalents) of sodium alcoholate in an autoclave for several hours at 75°–110° C. The reaction mixture obtained in this way is distilled, preferably under reduced pressure, to remove the unreacted monovinylacetylene and alcohol from the reaction product. An alternative method of preparation is to distill off the unreacted monovinylacetylene and then to remove the sodium alcoholate and unreacted alcohol, if the latter is sufficiently soluble, by washing with water. The insoluble reaction product is then purified by distillation. Steam distillation is advantageous in some cases. Since a small amount of monovinylacetylene polymer may be obtained as a by-product in the reaction, care must be taken in working up the mixture, for the polymer tends to undergo violent thermal decomposition when heated above approximately 110° C. This same precaution applies to reaction mixtures obtained from reactions involving divinylacetylene.

The products of the reaction of monovinylacetylene with alcohols have the formula (II), as illustrated in the following equations:

$$CH{\equiv}CCH{=}CH_2 \xrightarrow[RONa]{ROH} (CH_2{=}C{=}CHCH_2OR) \longrightarrow CH_3C{\equiv}CCH_2OR$$
$$\phantom{CH{\equiv}CCH{=}CH_2 \xrightarrow[RONa]{ROH} }(I) \phantom{XXXXXXXXXX} (II)$$

While we do not wish to commit ourselves with respect to the mechanism of the alcohol-monovinylacetylene reaction, this rather unexpected structure for the addition products would indicate that 1,4 addition of the alcohol to the conjugate system had first taken place and that the resulting butadienyl ether (I) then rearranged under the influence of the sodium alcoholate to give the isomeric acetylenic ether (II).

The reaction of monovinylacetylene with alcohols gives, in addition to the acetylenic ethers just described, small amounts of products which have the composition $(ROH)_2 \cdot C_4H_4$.

The reaction illustrated above is also applicable to divinylacetylene. The products in this case are believed to have the structure $$CH_3CH{=}C{=}C(OR)CH{=}CH_2.$$

Here too there is evidence of the addition of two mols of alcohol to one of divinylacetylene.

The following examples are given to illustrate the invention:

Example 1

A solution containing 8 parts by weight of sodium in 96 parts by weight of methyl alcohol was heated in a steel autoclave with 140 parts by weight of monovinylacetylene for six hours at 100±5° C. On subjecting the reaction mixture to distillation, 68 parts by weight of monovinylacetylene was recovered and 100 parts by weight of liquid product boiling at 50° to 58° C. under 387 mm. pressure was obtained. Upon redistillation this liquid product yielded 75 parts by weight of colorless, stable liquid, having a rather unpleasant odor and boiling at 99.5°–100° C./760 mm. The density and refractive index were, respectively, $$D\frac{20}{4}\ 0.8496$$

and $$N\frac{20}{D}\ 1.4262$$

This compound did not react with alkaline mercury reagent (test for acetylenic hydrogen) or with alpha-naphthoquinone (Diel's reaction). Upon reduction it yielded methyl n-butyl ether and upon oxidation it gave acetic and methoxy acetic acids. All of these properties are accounted for by the structure $CH_3C \equiv CCH_2OCH_3$.

*Example 2*

A solution of 2.5 parts by weight of sodium in 55 parts by weight of ethyl alcohol was heated in an autoclave with 55 parts by weight of monovinylacetylene for six hours at approximately 100° C. Four parts by weight of crystalline material, separated from the reaction mixture on standing over night. The liquid portion was distilled under reduced pressure and the distillate added to water. The upper layer comprising 51 parts by weight was washed twice with water, dried with magnesium sulfate, and distilled. The main portion boiled at 60°–64° C./100 mm. Upon redistillation 30 parts by weight of colorless, stable liquid, boiling at 119°–120° C./765 mm., was collected. The density and refractive index were, respectively, $$D\frac{20}{4}\ 0.8363$$

and $$N\frac{20}{D}\ 1.4290$$

The liquid possessed a characteristic rather disagreeable, hydrocarbon-like odor similar to the methyl derivative. Upon reduction, ethyl n-butyl ether was obtained. The compound did not react with alphanaphthoquinone and a portion boiling at 119°–120° C. did not react with alkaline mercury reagent.

*Example 3*

A mixture consisting of 5 parts by weight of sodium dissolved in 130 parts by weight of butyl alcohol and 68 parts by weight of monovinylacetylene was heated in an autoclave at approximately 100° C. for five hours. The resulting mixture was treated with water and the upper layer separated, dried with magnesium sulfate, and distilled. Thirty-five parts by weight of product was collected at 60°–61° C./20 mm., and upon redistillation boiled at 161°–162° C./756 mm. It was a colorless, stable liquid of rather spicy-like odor. It did not react with the mercury reagent. The density and refractive index were, respectively $$D\frac{20}{4}\ 0.8366$$

and $$N\frac{20}{D}\ 1.4362$$

*Example 4*

A mixture of 87 parts by weight of benzyl alcohol containing 5.5 parts by weight of dissolved sodium and 42 parts by weight of monovinylacetylene was heated in a steel bomb for 6.5 hours at 100°–105° C. The product was a viscous brown oil relatively free from unreacted monovinylacetylene. It was shaken with an ether-water mixture. The ether layer, after drying with magnesium sulfate and distilling, gave: (*a*) 12 parts by weight of benzyl alcohol, (*b*) 30 parts by weight of product boiling at 95°–105° C./3 mm., (*c*) 11 parts by weight of product boiling at 105°–170° C./3 mm., and (*d*) 30 parts by weight of brittle, resinous product. The aqueous layer also yielded 19 parts by weight of resinous material. On redistilling fraction (*b*), a clear liquid, boiling at 94.4°–96.4° C./3 mm. was obtained. This product, which analyzed correctly for a benzyl alcohol monovinylacetylene addition product, had a density of $$D\frac{20}{4}\ 0.9943$$

and a refractive index of $$N\frac{20}{D}\ 1.5271.$$

*Example 5*

A mixture of 134 parts by weight of monovinylacetylene containing 6 parts by weight of dissolved sodium and 160 parts by weight of ethylene glycol was heated in an autoclave for six hours at 105±5° C. On distillation the product gave a liquid boiling at 71°–72° C./4 mm. The density and refractive index of this product were, respectively $$D\frac{20}{4}\ 1.0152$$

and $$N\frac{20}{D}\ 1.4802$$

The reaction mixture also yielded a resinous product, unreacted ethylene glycol, and polymerized monovinylacetylene. Analysis of the product boiling at 71°–72° C./4 mm. indicated that it was a mono-addition product of ethylene glycol and monovinylacetylene.

Similar products may be derived from other polyhydric alcohols such as diethylene glycol, glycerol, dimethyldimethylol methane, monoethylin, monobenzylin, mannitol, sugars, starch, cellulose, etc. One or more of the alcoholic groups may react.

*Example 6*

A solution of 3.7 parts by weight of sodium in 80 parts by weight of cyclohexanol was heated in a steel bomb with 52 parts by weight of monovinylacetylene for six hours at 105±5° C. On distillation the reaction mixture yielded 87 parts by weight of liquid product which proved to be mono-addition product of cyclohexanol and monovinylacetylene. This material had an odor resembling that of tomato leaves. Its physical constants were: B. P. 64° C./2 mm.;

$$D\frac{20}{4}\ 0.9254$$

and $$N\frac{20}{D}\ 1.4745.$$

*Example 7*

A mixture of 52 parts by weight of monovinylacetylene and 76 parts by weight of monomethyl ether of ethylene glycol containing 4.6 parts by weight of dissolved sodium was heated at approximately 105° C. for six hours. On distillation the product yielded 104 parts by weight of liquid product boiling at 83°–87° C./30 mm. Analysis indicated that this material was a mono-addition product of monovinylacetylene and the glycol ether. Its density and refractive index were, respectively, $$D\frac{20}{4}0.9294$$

and $$N\frac{20}{D}1.4462.$$

Example 8

A mixture consisting of 115 parts by weight of monovinylacetylene and 120 parts by weight of isopropyl alcohol, containing 4.6 parts by weight of dissolved sodium, was heated in an autoclave for six hours at 105° C. On distilling the resultant mixture, seven parts by weight of a mono-addition product of monovinylacetylene and isopropyl alcohol was secured. The physical constants for this product are as follows: B. P. 132°–134° C./750 mm.;

$$D\frac{20}{4}0.8334;$$

and $$N\frac{20}{D}1.4244.$$

Example 9

A solution of 9.6 parts by weight of sodium in 148 parts by weight of tertiary butyl alcohol was heated in an autoclave with 104 parts by weight of monovinylacetylene for six hours at approximately 105° C. On distilling the reaction mixture the monovinylacetylene and tertiary butyl alcohol were largely recovered. However, a small amount of liquid product boiling at 125°–135° C. was obtained which analyzed fairly well for a mono-addition product of monovinylacetylene and tertiary butyl alcohol. The density and refractive index of this material (probably impure) were, respectively, $$D\frac{20}{4}0.8474$$

and $$N\frac{20}{D}1.4347.$$

Example 10

Seventy-eight parts by weight of divinylacetylene and 34 parts by weight of methyl alcohol, containing approximately 2.8 parts by weight of sodium methoxide, were heated together in a steel tube at 95°–100° C. for 6.5 hours. Some polymeric material separated during this time. The reaction mixture was dissolved in ether and after filtration from the polymer (10 parts by weight) the ethereal solution was washed with aqueous acetic acid, water, and dried. On evaporating the ether and distilling the residue in vacuo, there was received 18 parts by weight of divinylacetylene and 16 parts by weight of material boiling at 72°–80° C./60 mm. Redistillation of this material gave 12 parts by weight of product, boiling at 71°–75° C./58 mm. Oxidation indicated this material to be methoxy-4-hexatriene-2,3,5. The density and refractive index were, respectively, $$D\frac{20}{4}0.8781$$

and $$N\frac{20}{D}1.4715.$$

Example 11

A mixture of 156 parts by weight of divinylacetylene, 68 parts by weight of methyl alcohol, and 5.5 parts by weight of sodium methoxide was heated in a sealed tube at 95°–100° C. during 15 hours. The reaction mixture was worked up in the manner described in Example 10. There was received 27 parts by weight of mono-addition product (methoxy-4-hexatriene-2,3,5) which boiled at 71°–76° C./58 mm. The higher boiling residue gave 17 parts by weight of material (a) boiling at 60°–100° C./10 mm. and 5 parts by weight of material (b) boiling at 85°–90° C./1 mm. Redistillation of (a) gave 12 parts of material boiling over the wide range 58°–85° C./10 mm. Analysis showed this material to have the approximate composition $C_8H_{14}O_2$ corresponding to the addition of two moles of methyl alcohol to divinylacetylene. The physical properties of this material were found to be:

$$D\frac{20}{4}0.9197$$

and $$N\frac{20}{D}1.4618$$

Material (b) proved to be divinylacetylene dimer.

Examination of the preceding samples will show that the reaction of unsaturated hydrocarbons with alcohols has been applied to primary, secondary, and tertiary monohydric alcohols, to substituted monohydric alcohols, and to polyhydric alcohols. While all alcohols appear to be operative, primary alcohols react most readily. Substituted alcohols, for example aminoalcohols, partially esterified polyhydric alcohols, esters of hydroxy acids, etc., may also be used.

The same type of chemical reaction also takes place with mercaptans and thiophenols. With these sulphur compounds however, conditions do not have to be nearly so drastic, best results being obtained by allowing the hydrocarbon and mercaptan or thiophenol to stand in contact with each other at temperatures of 20°–60° C. in the presence of natural or artificial light. Several days' contact are usually required. Condensing agents such as sulfuric acid or strong alkalies may be used, if desired, but are not generally necessary. The following examples are illustrative:

Example 12

A mixture of 60 parts by weight of monovinylacetylene and 124 parts by weight of p-thiocresol was placed in a stoppered glass bottle and exposed to the rays of a strong electric lamp. The mixture became homogeneous in about two hours. After six days' exposure to light, the mixture was distilled, the products consisting of: (1) 67 parts by weight of clear liquid boiling at 99° C./1 mm., (2) 82 parts by weight of light-colored liquid boiling at 205° C./0.5 mm., and (3) 10 parts by weight of straw-colored liquid boiling largely at 270°–285 C./1 mm. Product #1 (D20/4 1.0273 and N20/D 1.5807) was found to be

p-$CH_3C_6H_4SCH_2CH_2C \equiv CH$.

The structures of Product #2 (D20/4 1.0929 and N20/D 1.6199) and of Product #3 (D20/4 1.1250 and N20/D 1.6248) were not determined but analyses indicated that they were, respectively, (p-$CH_3C_6H_4SH$)$_2.C_4H_4$ and (p-$CH_3C_6H_4SH$)$_3.C_4H_4$.

Example 13

A mixture of 30 parts by weight of monovinylacetylene and 62 parts by weight of benzyl mercaptan, contained in a stoppered glass bottle, was exposed to artificial light for 26 days. On distillation there was obtained, in addition to unreacted monovinylacetylene and benzyl mercaptan, 12 parts by weight of C₆H₅CH₂SH.C₄H₄ (B. P. 98°–99° C./1 mm., D20/4 1.0351, and N20/D 1.5794), 13 parts by weight of liquid boiling at 200°–215° C./1 mm., and 18 parts by weight of higher boiling products.

*Example 14*

Twenty-four parts by weight of p-thiocresol and eight parts by weight of divinylacetylene were allowed to stand in a stoppered flask for ten days. The crystalline mass obtained in this way gave, on recrystallization from alcohol, 23 parts by weight of white, glittering leaflets melting at 74°–75° C. This product was

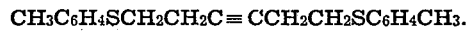
$$CH_3C_6H_4SCH_2CH_2C \equiv CCH_2CH_2SC_6H_4CH_3.$$

Likewise, in the place of the sulfur compounds of the preceding examples, we may use n-butyl mercaptan, diethylthiocarbinol, cyclohexyl mercaptan, mono- and dithio glycols, thioglycollic acid, etc., that is, any thiophenol, mercaptan, or compound containing SH and OH groups.

The products of this invention may find use, depending upon their properties, as perfume ingredients, solvents, insecticide ingredients, plasticizers, and in the case of the mercaptan addition products, as rubber chemicals.

The above description and specific examples are intended to be illustrative only and not as limiting the scope of the invention. Any variation therefrom which conforms to the spirit of the invention is intended to be included within the scope of the claims.

We claim:

1. In the process of forming condensation products the step which comprises heating an alcohol and a hydrocarbon, containing a conjugate system of unsaturation involving an acetylenic linkage, to reaction temperature in the presence of a strongly alkaline condensing agent.

2. In the process of forming condensation products the step which comprises reacting an alcohol and a hydrocarbon, containing a conjugate system of unsaturation involving an acetylenic linkage, in the presence of a strongly alkaline condensing agent at a temperature of 75°–110° C.

3. In the process of forming condensation products, the step which comprises heating to reaction temperature a member of the class consisting of monovinylacetylene and divinylacetylene with an alcohol in the presence of a strongly alkaline compound.

4. In the process of forming condensation products, the step which comprises heating a member of the class consisting of monovinylacetylene and divinylacetylene with an alcohol in the presence of a strongly alkaline compound at a temperature of 75°–110° C.

5. In the process of forming condensation products, the step which comprises heating a member of the class consisting of monovinylacetylene and divinylacetylene with an alcohol in the presence of a strongly alkaline compound at a temperature of 75°–100° C. for several hours.

6. In the process of forming condensation products, the steps which comprise heating a member of the class consisting of monovinylacetylene and divinylacetylene with an alcohol in the presence of a strongly alkaline compound at a temperature of 75°–110° C. for several hours, then distilling off the unreacted material.

7. The process which comprises reacting approximately chemical equivalent proportions of monovinylacetylene and an alcohol in the presence of a small amount of an alkali metal alcoholate at a temperature of 75°–110° C. for several hours.

8. The process which comprises reacting approximately chemical equivalent proportions of divinylacetylene and an alcohol in the presence of a small amount of an alkali metal alcoholate at a temperature of 75°–110° C. for several hours.

9. The process of claim 7 characterized in that sodium alcoholate is present in an amount of 0.05–0.20 chemical equivalents based on the monovinylacetylene.

10. The process of claim 8 characterized in that sodium alcoholate is present in an amount of 0.05–0.20 chemical equivalents based on the divinylacetylene.

11. The process which comprises heating a mixture comprising approximately chemical equivalent proportions of methyl alcohol and monovinylacetylene at a temperature of about 100° C. for about six hours in the presence of 0.05–0.20 chemical equivalents of sodium methoxide based on the monovinylacetylene.

12. A compound corresponding to the formula

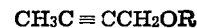
$$CH_3C \equiv CCH_2OR$$

in which R is a non-aromatic hydrocarbon radical having at least two carbon atoms.

13. A product produced by a process as described in claim 1 further characterized in that the alcohol contains at least two carbon atoms.

14. A product produced by a process as described in claim 2 further characterized in that the alcohol contains at least two carbon atoms.

15. A product produced by a process as described in claim 3 further characterized in that the alcohol contains at least two carbon atoms.

16. A product produced by a process as described in claim 4 further characterized in that the alcohol contains at least two carbon atoms.

17. A product produced by a process as described in claim 1 further characterized in that the alcohol is a monohydric alcohol containing at least two carbon atoms.

18. A product produced by a process as described in claim 1 further characterized in that the alcohol is a polyhydric alcohol.

19. A product produced by a process as described in claim 1 further characterized in that the alcohol is a normal primary monohydric alcohol containing at least two carbon atoms.

20. A compound corresponding to the formula:

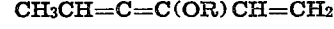
$$CH_3CH=C=C(OR)CH=CH_2$$

in which R is a non-aromatic hydrocarbon radical having at least two carbon atoms.

WALLACE H. CAROTHERS.
RALPH A. JACOBSON.